July 20, 1954
F. LYIJYNEN
2,684,320
TRIM PANEL AND METHOD OF MAKING THE SAME
Filed Sept. 12, 1950
2 Sheets-Sheet 1
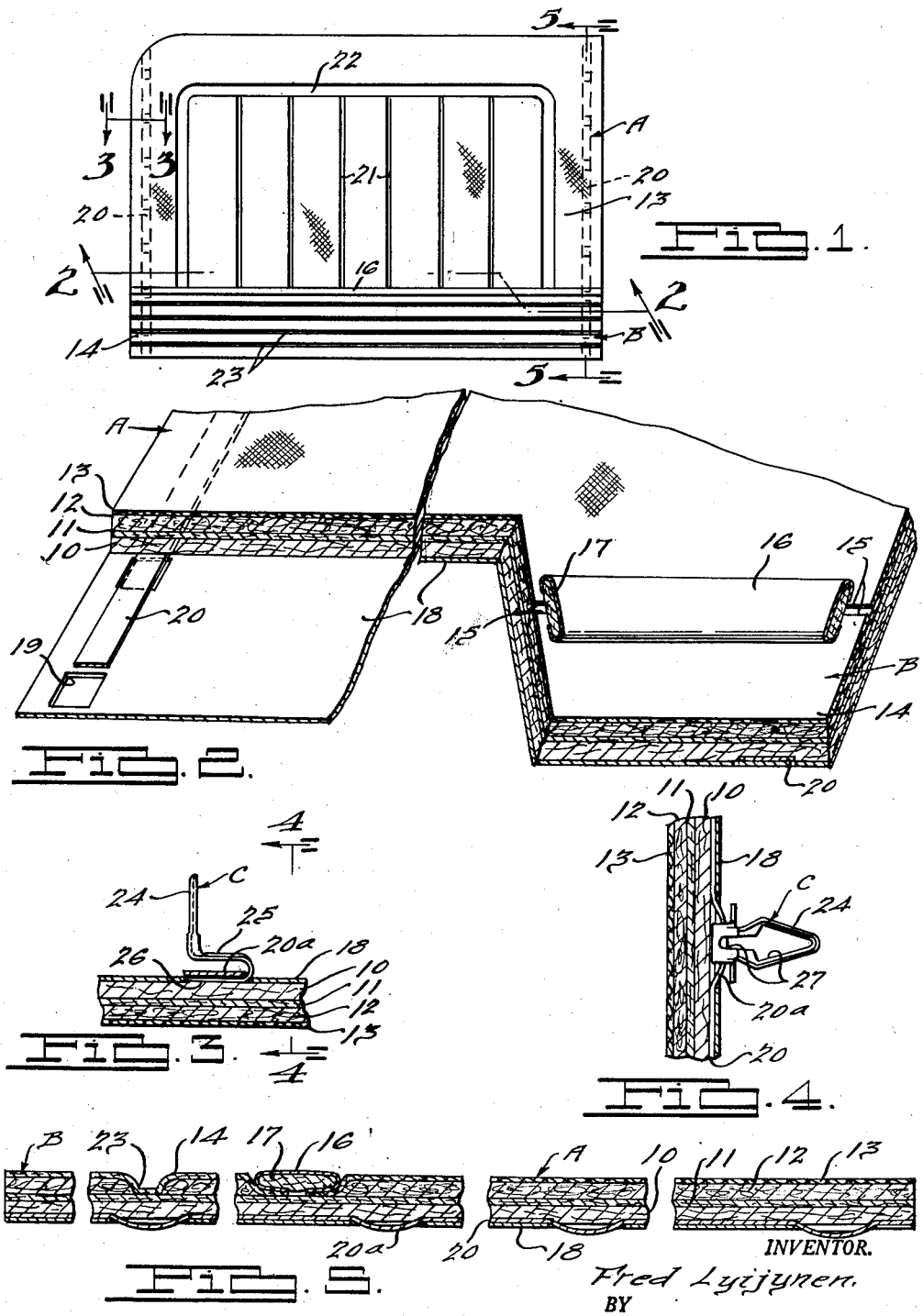
INVENTOR.
Fred Lyijynen.
BY
Elmer Jamison Gray
ATTORNEY.

July 20, 1954 F. LYIJYNEN 2,684,320
TRIM PANEL AND METHOD OF MAKING THE SAME
Filed Sept. 12, 1950 2 Sheets-Sheet 2
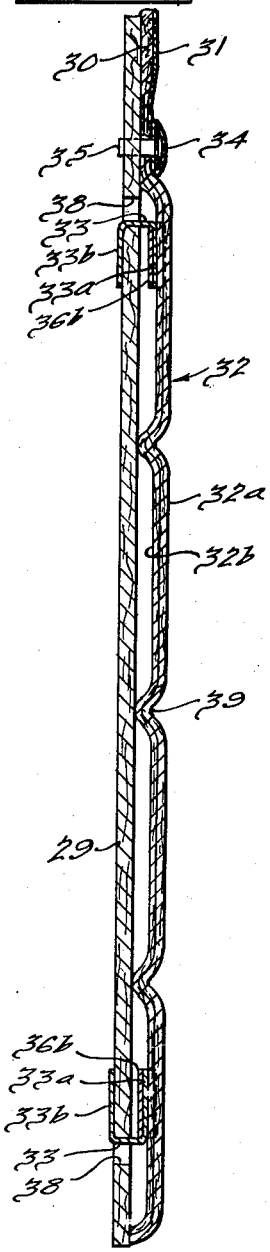
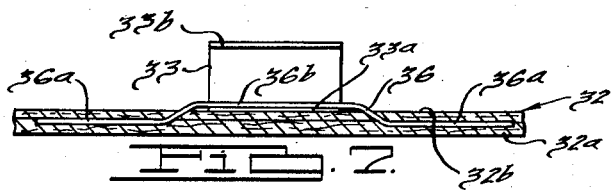
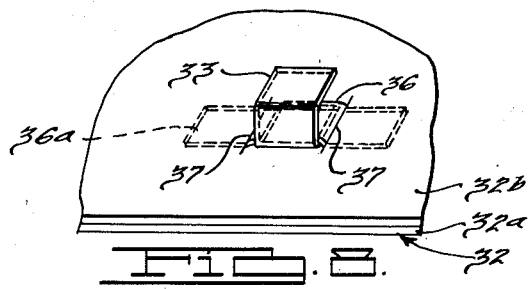
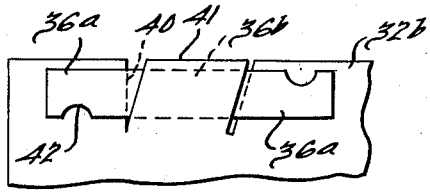
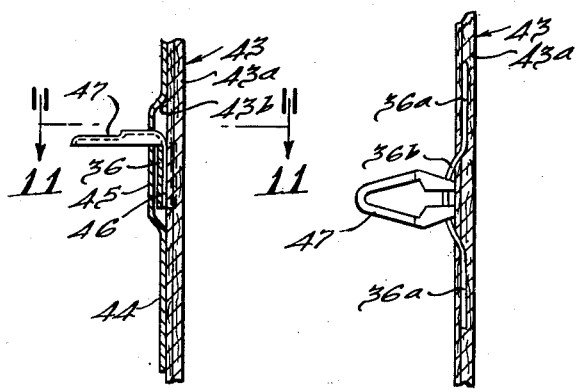
INVENTOR.
Fred Lyijynen.
BY
Elmer Jamison Gray
ATTORNEY.

Patented July 20, 1954

2,684,320

UNITED STATES PATENT OFFICE 2,684,320

TRIM PANEL AND METHOD OF MAKING THE SAME

Fred Lyijynen, Detroit, Mich., assignor to Briggs Manufacturing Company, Detroit, Mich., a corporation of Michigan Application September 12, 1950, Serial No. 184,401

5 Claims. (Cl. 154—118)

1

This invention relates to ornamental panels and to a method of making the same, such panels being particularly useful as inner trim panels of various types of vehicle bodies, especially automobile bodies.

A trim panel to which the present invention is applicable preferably comprises a number of superimposed sheets or layers of material consolidated or bonded together under heat and pressure through the medium of a bonding agent composed of a thermosetting or thermoplastic resinous material. Inasmuch as it is usually desirable that the trim panel possess considerable rigidity or stiffness, the panel is preferably of laminated composite nature including a foundation sheet or board, which itself may be composed of one or a plurality of layers, and one or more relatively thin top or cover sheets which may be treated for design or ornamental purposes. A portion or all of the upper area of the panel may be upholstered, such as by employing a top fabric sheet and a padding layer interposed between the fabric and foundation.

In the use of a trim panel as interior trim for an automobile body it is necessary to provide means for fastening the panel to the inner frame structure of the body. Such fastening means is preferably of a nature to permit the panel to be readily removed and also should desirably be concealed when the panel is installed in place.

An object of the invention is to provide an improved trim panel of the foregoing character having means embodied in the panel at the underside thereof for removably supporting fastener devices by which the panel may be attached to a supporting structure.

A further object of the invention is to provide a method of making an ornamental or trim panel so as to incorporate therein fastener retaining means of such nature as to enable fastener devices to be removably attached thereto.

Another object of the invention is to provide a trim panel having metallic fastener means permanently embedded in the panel in such manner as to provide projecting portions suitable for attaching the panel to a foundation or supporting structure.

Still another object of the invention is to produce a trim panel by consolidating together a plurality of bottom layers or sheets treated with resinous material with an interposed metal strip or strips having portions thereof exposed through apertures in the lowermost sheet, the metal strip or strips being permanently embedded and anchored in the foundation and, due to shrinkage of the latter after the curing operation, the tendency to foreshorten the metal strips will force the portions thereof exposed at the apertures in the bottom sheet through the apertures so as to provide loop portions suitable for use as fastener retaining means.

Other objects of this invention will appear in the following description and appended claims, reference being had to the accompanying drawings forming a part of this specification wherein like reference characters designate corresponding parts in the several views.

Fig. 1 is a top plan view of one form of trim panel constructed in accordance with the present invention.

Fig. 2 is an enlarged fragmentary isometric sectional view showing the elements of the panel of Fig. 1 arranged in superimposed relation immediately prior to the consolidation and bonding thereof together, the view being taken substantially in the direction of the arrows along the broken line 2—2 of Fig. 1 and a portion of the retainer strip and bottom layer being extended beyond the section line at the left.

Fig. 3 is an enlarged fragmentary section taken substantially through lines 3—3 of Fig. 1, looking in the direction of the arrows, showing a fastener device in assembled position.

Fig. 4 is a fragmentary section taken substantially through lines 4—4 of Fig. 3, looking in the direction of the arrows.

Fig. 5 is a fragmentary vertical section taken longitudinally of the retainer strip along the line 5—5 of Fig. 1, looking in the direction of the arrows.

Fig. 6 is a fragmentary vertical sectional view through the lower portion of a modified trim panel illustrating another embodiment of the present invention.

Figs. 7 and 8 are detail views illustrating the assembly of a fastener device to the kick panel shown in Fig. 6.

Fig. 9 is a detail view illustrating the manner in which the retainer strips in the embodiment of Figs. 6 through 8 may be assembled with the kick panel.

Fig. 10 is a fragmentary sectional view similar to Fig. 3, but showing another modification of a trim panel fastened directly to a metal body panel.

Fig. 11 is a fragmentary section taken substantially along the line 11—11 of Fig. 10, looking in the direction of the arrows, showing the trim panel detached from the body panel.

It is to be understood that the present invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

For the purpose of illustrating one application of the present invention, there is illustrated in Figs. 1 through 5 by way of example a trim panel of the type which may be used as a finish trim on the inside of an automobile body, such as on the door thereof. Trim panels of this type are frequently fabricated with a main upper part A, which may be covered with fabric or cloth having an underlying layer of padding, and a lower rather narrower part B, often termed a kick panel, which may also be padded and covered, usually with a layer of more durable material such as carpeting, imitation leather, or a layer of fabric of different color appearance or characteristic than the upper covering layer.

In general the trim panel made in accordance with the present invention comprises a stiff foundation board 10 of any suitable composition, preferably of compressed fibrous stock so as to have the requisite strength, rigidity and stiffness.

Arranged in superimposed relation on the foundation 10 are a relatively thick paper sheet 11 adjacent the foundation and a layer of padding or wadding 12 overlying the sheet 11. Overlying the padding 12 for the upper area A is a cover layer 13 preferably of cloth or fabric material. The padding for the kick panel area B is covered with a suitable fabric material or sheet 14, which as stated above may also comprise carpeting, imitation leather, or any other desired wear resistant material. The adjacent edges of the layers 13 and 14 at the juncture of the panel areas A and B are separated by a gap 15 which may vary considerably in width and which is closed by means of an ornamental molding 16. The latter in the present instance comprises an outer thin metal strip in channel form carrying an insert strip 17 treated or impregnated with a suitable bonding agent, such as a thermosetting reactive resinous substance. Preferably the molding 16 extends the full width of the panel, its ends being bent around the side edges of the panel and suitably secured to the backside thereof by staples or other means.

Arranged beneath the foundation 10 is a bottom layer 18 which may be a relatively thin alpha-cellulose or fiber sheet, or if desired, a fabric layer. Before assembling the layer 18 with the foundation and cover materials, it is perforated to provide a number of vertically aligned apertures 19 spaced from top to bottom of the panel adjacent each of its opposite side edges, Figs. 1 and 2. Between the bottom layer 18 and the foundation 10, a thin flat metal retainer strip 20 is arranged adjacent each side edge of the panel. The metal strips 20 may comprises spring steel and are arranged to extend substantially the full height of the panel in line with the apertures 19. Thus with the various laminations and metal strips 20 assembled as indicated in Fig. 2, the portions of each strip 20 overlying the apertures 19 are exposed therethrough at the bottom of the panel.

Similar to the impregnated strip 17, the layers 11 and 18, as well as the foundation 10 if desired, especially along the underportions thereof overlying the strips 20, are also treated or impregnated with a suitable bonding substance, preferably in the form of a thermoplastic or a partially polymerized or reacted thermosetting resin. Any suitable resinous material may be used as a binder between the sheet laminations of the trim panels in the various embodiments herein shown and described. I prefer to use a phenol-formaldehyde, a urea formaldehyde, or a melamine resin or combinations thereof which may be converted into a varnish by the use of suitable solvents in order to facilitate application to the laminations. This resinous material is only in a partially cured or reacted condition at the time the laminations are introduced into the press. Accordingly in fabrication of the panel, its various laminations, including the strips 20 and molding 16 are formed to their desired shapes and arranged in superimposed relation as shown in Fig. 2. The laminations are than subjected to heat and pressure between the heated dies or platens of a suitable press, whereby the final curing or polymerization of the resin is completed and the laminations are consolidated and bonded together.

In the present instance the laminations are in part secured or bonded together especially along ornamental lines defined by relatively deep indentations or grooves, such as the vertical grooves 21 and the U-shaped groove 22 in the upper area A of the panel and the horizontal grooves 23 in the kick pad area B. In this regard, the die or platen of the press which confronts the face of the panel is suitably ribbed to emboss the indentations or grooves 21, 22 and 23 into the compressible panel layers and is also provided with a suitable die portion adapted to overlie the full length of the molding 16 so as to force the latter into the panel face. Along the grooves or compressed areas 21, 22 and 23 and beneath the molding 16, the resinous bonding material in the sheet 11 and insert strip 17 will flow into the compressed wadding or padding layer 12 and will penetrate to some extent the top covering layers 13 and 14. The temperature and pressure is regulated during the press operation so that the resinous material is cured or brought to a final stage of reaction or polymerization. As a result these layers are consolidated and bonded permanently to each other and to the molding 16 and foundation 10 at the compressed localities. By this structure, the panel layers are securely and permanently bonded together upon completion of the curing or reaction of the resin, while substantial areas of the panel between the molding 16 and grooves 21, 22 and 23 remain uncompressed, giving the panel as a whole a soft upholstered effect. The arrangement of the grooves or indentations is purely for illustrative purposes. It will be apparent that the lines or localities at which the laminations are pressed and bonded together may be varied as to configuration or otherwise in order to produce any desired pattern or design.

The face of the die or platen which engages the bottom layer 18 during the press operation is plane so as to press substantially uniformly against the entire area of the bottom layer 18. Thus while the upper panel layers are bonded together along the grooves 21, 22 and 23, and under the molding 16, the resin in the treated under surface of the foundation 10 and bottom layer 18 is reacted so as to bond these layers permanently to each other and to the interposed metal strips 20.

When the finished panel is removed from the press and cooled, it will shrink to a certain extent. As a result of shrinkage of the panel in the direction of the length of the strips 20, forces are exerted tending to shorten these strips, causing portions 20a thereof to bulge downwardly through the apertures 19, Fig. 5.

As shown in Figs. 3 and 4, the projecting or bulging portions 20a of the metal strips 20 provide, in accordance with the present invention, retainer means for the removable attachment thereto of projecting fastener devices C. Any suitable fastener device having a base which may be slid underneath the loop-like retainer portion 20a may be used. In the present instance the fastener device C comprises a wedge-shaped portion 24 projecting outwardly at right angles to the plane of the bottom of the trim panel. This portion 24 terminates in a laterally bent portion 25 which is return bent to provide a base 26 adapted to be inserted beneath the loop-like portion 20a and frictionally held in position between this portion and the adjacent bottom surface of the foundation sheet. The portions 24 and 25 of the fastener device C are split at 27 throughout most of their length to permit a degree of expansion and contraction when the fastener device is forced through a hole in the frame structure of the vehicle body in order to attach the panel thereto.

From the foregoing it will be seen that the trim panel in the embodiment of Figs. 1 to 5 inclusive is provided with molded-in metal strips 20 along the edges thereof which produce at suitable intervals in their length projecting fastener holding portions 20a. The bottoms of these portions lie very close to the plane of the bottom of the sheet 18 and hence do not produce objectionable projections on the bottom of the panel. With this construction the panels may be readily stacked together flat for the purposes of shipment. When the panel is ready to be installed upon the vehicle body, the fastener devices C may be readily and quickly attached to the retainer portions 20a. The panel is then assembled on the vehicle door or body frame by forcing all of the wedge-shaped projecting ends 24 of the fasteners through correspondingly located apertures in the door or body frame.

Another embodiment of the invention is illustrated in Figs. 6-8 in application with a modified trim panel wherein the lower kick panel portion comparable to the area B of Fig. 1 comprises two superimposed separately formed sections connected together by fastener elements. The trim panel in this embodiment comprises a foundation sheet or board 29 fabricated in the manner previously described and having the upper area thereof covered as for example by a layer of padding 30 and an outer trim layer 31 of fabric or other suitable material. The fabric layer 31 and the wadding or padding layer 30 are permanently joined to the foundation board 29 by means of a suitable binder, such as a thermoplastic or thermosetting resinous substance, this being preferably accomplished in a press under heat and pressure to effect consolidation of these layers or laminations. The lower portion of the foundation board 29 is thereafter covered by means of a kick panel section 32 which is separately formed and may comprise two or more layers of fibrous material consolidated together through the medium of a thermoplastic or thermosetting resinous substance.

The kick panel section 32 illustrated in Fig. 6, by way of example comprises outer and inner laminations 32a and 32b preferably in the form of white wood pulp or other fine grain cellulosic material and is secured to the foundation 29 by a number of metal fasteners 33, discussed below, suitably located as for example along the top, side, and bottom edges of the panel 32. The upper edge of the kick panel section 32 extends into abutting relation with the lower edge of the covering material 30, 31, whereat the horizontal juncture between these upper and lower portions is covered by a horizontal metal molding strip 34 secured to the foundation board 29 by fasteners 35 projecting through the foundation and clinched over at the back thereof.

The fastener elements 33 for attaching the kick panel section 32 to the foundation board 29 are carried by short sheet metal retainer strips or clips 36 firmly anchored at opposite ends between the layers or laminations 32a and 32b, Fig. 7. Each retainer strip 36 is assembled prior to consolidation of the sheets 32a, 32b by inserting its opposite ends 36a through spaced slits 37 in the sheet 32b in a manner to expose an intermediate portion 36b of the retainer strip at the back of the sheet 32b. The outer sheet 32a is then superimposed on the sheet 32b and the two sheets are consolidated by heat and pressure so as to anchor the end portions 36a firmly therebetween. As in the first embodiment above described, the intermediate portion 36b of the retainer strip will bulge outwardly due to the shrinkage or contraction of the sheets 32a and 32b upon cooling thereof after removal from the press. Thus the bulged portions 36b of the retainer strips will be spaced rearwardly from the face of the sheet 32b sufficiently to permit attachment thereto of the aforesaid fastener elements 33. Each fastener element 33 comprises a metal piece having a base 33a insertable beneath the retainer portion 36b and a portion projecting at right angles thereto which may be inserted through an appropriate slot 38 in the foundation 29 and then bent or clinched down at 33b so as to anchor the kick panel section 32 firmly in place on the foundation board 29.

By forming the kick panel section 32 in the embodiment of Figs. 6 through 8 separately from the foundation board 29 and the remainder of the trim panel, it is possible to utilize inexpensive dies and permit considerable savings in the cost of production of the trim panel. The several layers used in fabricating the kick panel section 32 may first be consolidated together between flat heated dies of inexpensive nature, during which operation the retainer strips 36 are united to the sheets 32a, 32b. Thereafter while the consolidated layers are still in heated and pliable condition, the panel section 32 may be introduced between inexpensive hard wood dies and suitable grooves or indentations 39 pressed into the sheet to give the desired ornamental appearance or pattern to the kick panel.

Where the retainer strips 36 for the fasteners 33 are located adjacent the edges of the kick panel section 32, they may if desired be installed in the manner illustrated in Fig. 9. In this instance the edge of the sheet 32b is slit inwardly along spaced lines 40 and the intermediate edge portion 41 is bent forward to permit insertion of the fastener strip 36. The latter is inserted through the spaced slits 40 so that the intermediate portion 36b is exposed at the back of the sheet. Consolidation of the sheets 32a and 32b together firmly anchors the ends 36a in position between the sheets. Upon contraction of the latter, the intermediate portion 36b will bulge outwardly to permit attachment thereto of a fastener element 38. Where desired, the end portions 36a of the fastener strip are provided with notches 42, Fig. 9, which assist in locking the strip 36 against displacement between the consolidated sheets 32a, 32b.

Referring to the embodiment illustrated in Figs. 10 and 11, a fragmentary portion of a panel 43 is shown which in the present instance may serve the purpose of a kick panel used to trim the inside of a vehicle door and comprises two layers 43a and 43b of wood pulp or other fine grain cellulosic material. These layers are consolidated together through the medium of a thermoplastic or thermosetting resin, as in the manner previously described. Incorporated therewith are fastener retaining strips 36, having end portions 36a anchored between the sheets 43a and 43b and an intermediate bowed or loop-like portion 36b. The construction and manner in which the retainer strips 36 are consolidated with the laminations of the panel section 43 may be the same as described above in connection with the embodiment of Figs. 6 through 8, or Fig. 9.

The retainer strips 36 are spaced along the side and bottom edges of the panel section 43 in positions for the removable attachment thereto of any suitable type of fastener device. In the present embodiment, L-shaped snap fasteners are utilized, each having a base or leg 46 which may be slid underneath the loop-like or bulged retainer portion 36b and also having a yieldable wedge-shaped leg 47 projecting outwardly at right angles to the plane of the bottom of the panel section 43. Thus the panel section 43 may be installed directly on a supporting structure, such as an inner metal door panel 44, Fig. 10, having apertured outward offset portions 45 for insertion snugly therethrough of the projecting fastener legs 47.

I claim:
1. In the method of making a panel, the steps of bonding together a plurality of superimposed layers adapted to be shrunk and an interposed flat retainer strip having portions thereof exposed at openings in one face of the panel, and shrinking said layers with respect to said strip to buckle the exposed portions of the strip outward from said face of the panel.

2. In the method of making a panel, the steps of placing a spring metal strip between two superimposed sheets in line with spaced apertures in one of said sheets exposing portions of the strip therethrough, bonding the sheets together under the influence of heat and pressure through the medium of a bonding agent to bind the strip between the sheets, and shrinking the sheets to buckle the exposed portions of the strip outward through said apertures to provide fastener attaching means.

3. In the method of making a panel comprising two layers and an interposed spring metal strip having portions thereof bulging through a plurality of apertures in one of said layers spaced longitudinally of the strip, the steps of treating at least one of said layers with an incompletely polymerized thermosetting bonding resin, arranging said layers in superimposed relation with said strip interposed therebetween in line with said apertures, bonding the layers together under the influence of heat and pressure to complete the polymerization of the resin and to bind the strip between the layers, and shrinking the layers to buckle the portions of the strip exposed at said apertures outwardly therethrough to provide fastener attaching means.

4. In the method of making a panel, the steps of laminating two layers with an incompletely polymerized thermosetting bonding resin therebetween and also with a metal strip arranged therebetween with an intermediate portion of the strip exposed through an aperture in one layer, bonding said layers together and at least one thereof to said strip by completing the polymerization of the resin under the influence of heat and pressure, and shrinking the layers to buckle the exposed portion of the strip outward through said aperture.

5. In the method of making a panel, the steps of bonding a covering layer to a foundation and to a metal retainer strip interposed therebetween and shrinking said layer to foreshorten the strip and buckle an intermediate portion thereof through an opening in said layer to provide fastener attaching means.

References Cited in the file of this patent
UNITED STATES PATENTS

| Number | Name | Date |
|---|---|---|
| 1,942,119 | Place | Jan. 2, 1934 |
| 1,948,462 | Le Page | Feb. 20, 1934 |
| 1,972,412 | Van Dresser | Sept. 4, 1934 |
| 2,028,992 | Place | Jan. 28, 1936 |
| 2,150,458 | Randall | Mar. 14, 1939 |
| 2,231,529 | Day | Feb. 11, 1941 |
| 2,361,438 | Turner | Oct. 31, 1944 |
| 2,389,636 | Reingruber et al. | Nov. 27, 1945 |
| 2,401,987 | Taylor et al. | June 11, 1946 |
| 2,581,195 | Lyijynen | Jan. 1, 1952 |